United States Patent Office 3,002,006
Patented Sept. 26, 1961

3,002,006
PROCESS OF PREPARING 17α-BROMO-6α-FLUOROPROGESTERONE
David J. Marshall, Westmount, Quebec, Canada, assignor to American Home Products Corporation, New York, N.Y., a corporation of Delaware
No Drawing. Filed Apr. 27, 1959, Ser. No. 808,944
1 Claim. (Cl. 260—397.3)

The steroid compound 17α-bromo-6α-fluoro-4-pregnen-3,20-dione (17α-bromo-6α-fluoroprogesterone) and its preparation from readily available starting materials is described and claimed in my copending application, Serial No. 767,091, filed October 14, 1958, now U.S. Patent No. 2,924,610, of which the present application is a continuation-in-part.

This application is concerned with a new and improved method for the synthesis of 17α-bromo-6α-fluoroprogesterone. It is also concerned with certain novel chemical compounds that are formed as intermediates in this synthesis.

In my improved process for the synthesis of 17α-bromo-6α-fluoroprogesterone, as herein described, the advantages are the saving of one step over the process as described in my copending patent application, the carrying out of the epoxidation reaction with the starting material rather than with an expensive intermediate, and the fact that the starting material is more readily available.

As starting material in my improved process for the synthesis of 17α-bromo-6α-fluoroprogesterone I utilize the known compound 3β-acetoxy-5α-hydroxy-6β-fluoropregnan-20-one. This compound is described by Bowers and Ringold in Tetrahedron, volume 3, page 14 (1958).

The starting material 3β-acetoxy-5α-hydroxy-6β-fluoropregnan-20-one is allowed to react with acetic anhydride in the presence of an acid catalyst forming 3β,5α,20-triacetoxy-6β-fluoro-17(20)-pregnene. On treatment of the latter compound with a brominating agent such as bromine or hypobromous acid there results the compound 17α-bromo-3β,5α-diacetoxy-6β-fluoropregnan-20-one. Acid-catalyzed hydrolysis of the diacetate, as for example with perchloric acid in methanol, results in selective hydrolysis of the 3-acetoxy group, yielding 17α-bromo-3β-hydroxy-5α-acetoxy-6β-fluoropregnan-20-one. Oxidation of the latter as, for example, with sodium dichromate in acetic acid yields 17α-bromo-5α-acetoxy-6β-fluoropregnan-3,20-dione. When this diketone is treated with a strong mineral acid, such as hydrochloric acid, it undergoes elimination of the elements of acetic acid and inversion at carbon atom No. 6, yielding the desired product 17α-bromo-6α-fluoroprogesterone. This process may be indicated diagrammatically as follows:

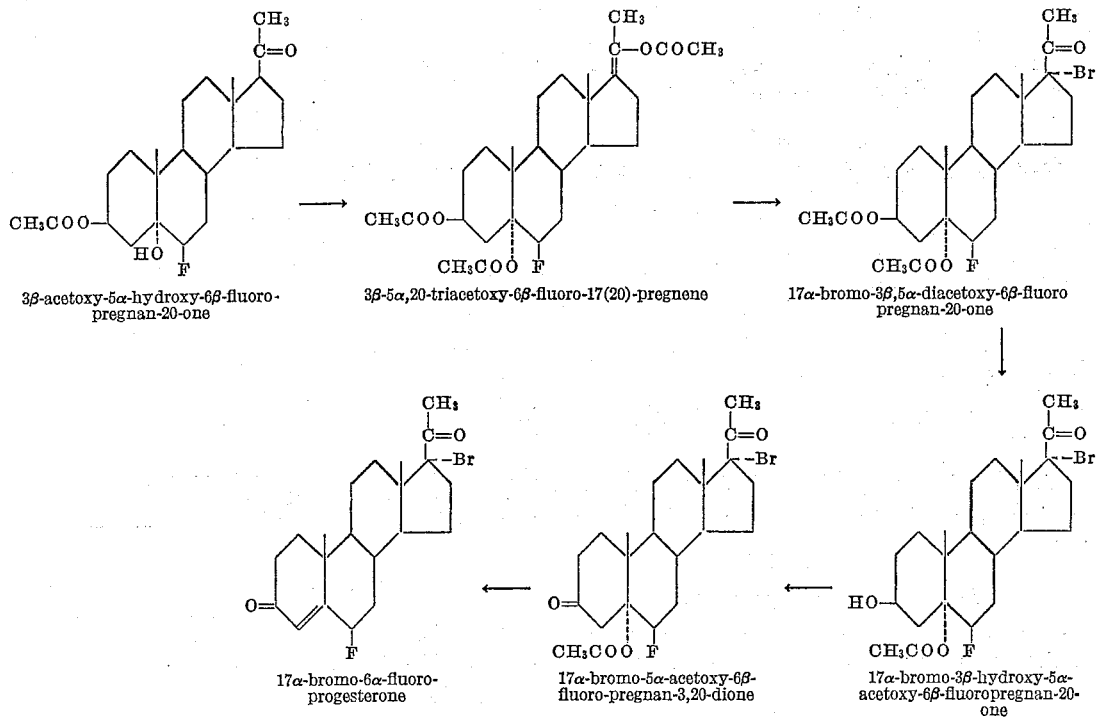

EXAMPLE 1

*17α-bromo-3β,5α-diacetoxy-6β-fluoropregnan-20-one*

To a solution of 2.0 grams of 3β-acetoxy-5α-hydroxy-6β-fluoropregnan-20-one in 19 ml. of carbon tetrachloride there was added 1 ml. of acetic anhydride containing 0.04 ml. of 70 percent perchloric acid. After standing for three hours at room temperature, the mixture was washed with ice-cold 5 percent sodium carbonate solution and water, dried over magnesium sulfate, and the solvent was evaporated. The residue, dissolved in benzene, was chromatographed on 30 grams of neutral alumina. 250 ml. of benzene eluted 2.02 grams of non-crystalline enol triacetate.

A brominating mixture was made by dissolving 1.50 grams of bromine, 0.50 gram of potassium acetate, and 0.50 ml. of water in acetic acid and making up the volume of the solution to 10 ml. with acetic acid. To a solution of 1.60 grams of the above-described enol triacetate in 16 ml. of acetic acid was added dropwise 3.44 ml. of the brominating solution. After two to three minutes, 12 ml. of water was added dropwise, followed by dilute sodium bisulfite solution until the yellow color disappeared. The mixture was cooled in ice and filtered, and the solid product was crystallized from methanol, yielding 17α-bromo-3β,5α-diacetoxy-6β-fluoropregnan-20-one, M.P. 180–182° C., $(\alpha)_D^{24°}$ —47.8° (C=1% in chloroform).

Calculated for $C_{25}H_{36}BrFO_5$: C, 58.25; H, 7.04; Br, 15.51; F, 3.69. Found: C, 58.15; H, 6.82; Br, 15.66; F, 3.52.

EXAMPLE 2

*17α-bromo-3β-hydroxy-5α-acetoxy-6β-fluoropregnan-20-one*

To a solution of 0.40 gram of the diacetate, as prepared in Example 1, in 9 ml. of methanol there was added 0.25 ml. of 70 percent perchloric acid. The solution was heated to the boiling point and then allowed to stand at room temperature for 22 hours. Concentration in vacuo and addition of water precipitated 17α-bromo-3β-hydroxy-5α-acetoxy-6β-fluoropregnan- 20 - one, which, after recrystallization from methanol-water, melted at 193° (dec.) and showed an optical rotation of $(\alpha)_D^{24°}$ —47.1° (C=1% in chloroform).

Calculated for $C_{23}H_{34}BrFO_4$: C, 58.34; H, 7.24; Br, 16.89; F, 4.01. Found: C, 58.49; H, 7.41; Br, 16.96; F, 4.05.

EXAMPLE 3

*17α-bromo-5α-acetoxy-6β-fluoropregnan-3,20-dione*

To a solution of 0.80 gram of 17α-bromo-3β-hydroxy-5α-acetoxy-6β-fluoropregnan-20-one, as prepared in Example 2, in 8 ml. of acetic acid cooled to about 15° C. there was added a solution of 0.80 gram of sodium dichromate dihydrate in 15 ml. of acetic acid. After standing for 19 hours at room temperature, 2 ml. of methanol was added to the solution, and the product was precipitated with water. Crystallization from methanol-water yielded 17α-bromo-5α-acetoxy-6β-fluoropregnan-3,20-dione, M.P. 155–157° C., $(\alpha)_D^{24°}$ —46.4° (C.=1% in chloroform).

Calculated for $C_{23}H_{32}BrFO_4$: C, 58.60; H, 6.84; Br, 16.95; F, 4.03. Found: C, 58.69; H, 7.05; Br, 16.90; F, 4.02.

EXAMPLE 4

*17α-bromo-6α-fluoroprogesterone*

Anhydrous hydrogen chloride was passed through a solution of 3.5 grams of 17α-bromo-5α-acetoxy-6β-fluoropregnan-3,20-dione in 105 ml. of chloroform for 1.5 hours. The solution was allowed to stand for an additional 1.5 hours, nitrogen was passed through for 10 minutes, and the solution was washed with 10 percent sodium bicarbonate solution and water. Drying over magnesium sulfate and evaporation in vacuo left a residue which was crystallized from acetone-hexane, yielding 17α-bromo-6α-fluoroprogesterone, M.P. 177–177.5° C. (dec.) identical with the compound as described in my copending application, Serial No. 767,091.

I claim:

The process for the preparation of 17α-bromo-6α-fluoroprogesterone which comprises converting 3β-acetoxy-5α-hydroxy-6β-fluoropregnan-20-one to 3β,5α,20-triacetoxy-6β-fluoro-17(20)-pregnene by reaction with acetic anhydride and an acid catalyst; reacting the thus formed triacetate with bromine in acetic acid solution, said reaction being carried out at substantially room temperature to obtain 17α-bromo-3β,5α-diacetoxy-6β-fluoropregnan-20-one; selectively hydrolyzing the thus obtained 17α-bromo-3β,5α-diacetoxy-6β-fluoropregnan-20-one with perchloric acid to obtain 17α-bromo-3β-hydroxy-5α-acetoxy-6β-fluoropregnan-20-one; reacting the thus obtained 17α-bromo-3β-hydroxy-5α-acetoxy-6β - fluoropregnan-20-one with sodium dichromate in acetic acid solution to obtain 17α-bromo-5α-acetoxy-6β-fluoropregnan-3,20-dione; and reacting the thus obtained 17α-bromo-5α-acetoxy-6β-fluoropregnan-3,20-dione with anhydrous hydrogen chloride to obtain 17α-bromo-6α-fluoroprogesterone.

References Cited in the file of this patent

UNITED STATES PATENTS

| | | |
|---|---|---|
| 2,520,656 | Reichstein | Aug. 29, 1950 |
| 2,752,341 | Magerlein | June 26, 1956 |
| 2,838,528 | Campbell et al. | June 10, 1958 |

OTHER REFERENCES

Hattori: J. Pharm. Soc. Japan, 59, 129 (1939).
Davis et al.: J. Chem. Soc. (London), 2536 (1949).
Fieser & Fieser: "Steroids," Reinhold Publishers Corp. (New York), page 193 (1959).

UNITED STATES PATENT OFFICE
CERTIFICATE OF CORRECTION

Patent No. 3,002,006            September 26, 1961

David J. Marshall

It is hereby certified that error appears in the above numbered patent requiring correction and that the said Letters Patent should read as corrected below.

Column 1, formula "17α-bromo-6α-fluoro-progesterone" should appear as shown below instead of as in the patent:

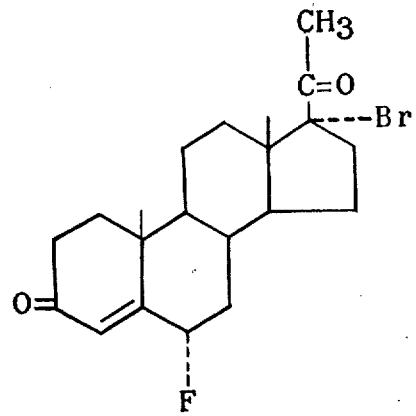

Signed and sealed this 24th day of April 1962.

(SEAL)
Attest:

ESTON G. JOHNSON
Attesting Officer

DAVID L. LADD
Commissioner of Patents